United States Patent [19]

Balint

[11] 4,238,586
[45] Dec. 9, 1980

[54] GROUP VA AND VII OXYGEN MINERAL ACIDS AS CATALYST MODIFIERS

[75] Inventor: Nikolaous K. Balint, Naperville, Ill.

[73] Assignee: Standard Oil Company (Indiana), Chicago, Ill.

[21] Appl. No.: 35,602

[22] Filed: May 3, 1979

Related U.S. Application Data

[62] Division of Ser. No. 947,086, Sep. 29, 1978.

[51] Int. Cl.³ .................................................. C08F 4/64
[52] U.S. Cl. .............................. 526/137; 252/429 B; 252/429 C; 526/138; 526/351
[58] Field of Search ................................. 526/137, 138

[56] References Cited

U.S. PATENT DOCUMENTS

| | | | |
|---|---|---|---|
| 3,129,256 | 4/1964 | Hay et al. | 252/429 B X |
| 3,161,628 | 12/1964 | Dost et al. | 252/429 B X |
| 3,271,381 | 9/1966 | Andersen et al. | 252/429 B X |
| 3,669,945 | 6/1972 | Nakaguchi et al. | 252/429 B X |
| 3,770,839 | 11/1973 | Matsushima | 252/429 B X |

*Primary Examiner*—Stanford M. Levin
*Attorney, Agent, or Firm*—Wallace L. Oliver; William T. McClain; William H. Magidson

[57] ABSTRACT

A propylene polymerization catalyst is formed by incorporation into a catalytic mixture, comprising a transition metal compound and an organoaluminum compound, effective amounts of Group Va or Group VII oxygen mineral acids whereby the amount of n-hexane-soluble polymeric product is decreased.

14 Claims, No Drawings

1

GROUP VA AND VII OXYGEN MINERAL ACIDS AS CATALYST MODIFIERS

This is a division of application Ser. No. 947,086 filed Sept. 29, 1978.

BACKGROUND OF THE INVENTION

This invention relates to propylene polymerization catalysts and particularly relates to catalyst systems which produce commercially acceptable levels of low molecular weight and, especially, substantially amorphous polymers as determined by the amount of polymerized product which is soluble in n-hexane at room temperature ("Hexane Solubles").

The polymerization of propylene to normally-solid, substantially crystalline polymers using heterogeneous catalysts comprising transition metal halides and aluminum alkyls now is well known in the art. However, there is a continuing need in the industry for complete catalyst systems which produce a high yield, as measured by the grams of crystalline product per gram of transition metal halide consumed, while producing a minimum amount of Hexane Solubles. In a slurry polymerization process which uses a hydrocarbon solvent, such as n-hexane, amorphous and low molecular weight polymer accumulates in the solvent which necessitates extensive solvent purification procedures. Since the economic value of such n-hexane-soluble polymer is lower than normally-solid, substantially crystalline product, the overall process becomes less efficient as the amount of Hexane Solubles increases. A commercially desirable catalyst system would produce low amounts of Hexane Solubles while maintaining reasonable yields. The product produced using such catalyst system desirably has acceptable odor and environmental qualities. Also desirable is a low concentration of residual titanium.

In a solventless, liquid-phase bulk polymerization or in a gas phase process, the production of polymers which contain more than about 2% of Hexane Solubles requires a separate extraction procedure to produce commercially acceptable products and makes these inherently efficient processes uneconomical. Therefore, polymerization processes which produce low amounts of Hexane Solubles while not adversely affecting polymerization yield are in demand.

Various catalyst modifiers in addition to transition metal halides and aluminum alkyls have been disclosed to minimize Hexane Solubles in alphaolefin polymerizations. Such modifiers include aromatic or aliphatic amines, esters, amides, phosphites, phosphines, phosphine oxides, aldehydes, tetraorganosilyl compounds such as tetraalkyl-, tetraaryl- and tetraalkoxysilanes, sterically hindered cyclic amines, amine N-oxides and organotin sulfides. Known catalyst modifiers include the combination of hydrogen sulfide, sulfur dioxide or bis-(tributyl)tin sulfide with an aromatic amine or amine oxide such as lutidine, collidine (2,4,6-trimethylpyridine) and lutidine-N-oxide. Specific catalyst systems including such combinations of modifiers are described in U.S. Pat. Nos. 3,950,268 and 4,072,809 both incorporated by reference herein. Although such modifiers do tend to decrease Hexane Solubles, they or their reaction products may produce undesirable odor or other effects in polymeric product.

Molecular weights of alpha-olefin polymers have been controlled by addition of "hydrogen active" compounds such as mineral acids to the olefin stream or directly to the polymerization reaction (U.S. Pat. No. 3,161,628). U.S. Pat. No. 2,971,950 discloses adding anhydrous hydrogen halide or alkyl halide to an alpha-olefin polymerization to control molecular weight. U.S. Pat. No. 3,271,381 uses 0.5 to 3 gram-equivalents of a strong acid per gram-atom of titanium to control molecular weight of polyolefins.

The use of halogen acids, e.g., HCl or HBr to treat catalyst supports is taught in U.S. Pat. Nos. 3,658,722 and 3,888,789. Hydrogen chloride gas has been incorporated in alpha-olefin polymerization to produce elastomers (U.S. Pat. No. 3,563,964) and to change polymerization to a cationic process (U.S. Pat. No. 3,692,712). U.S. Pat. No. 3,275,569 teaches reducing titanium tetrahalide with aluminum in the presence of a hydrogen halide to form a polymerization catalyst component, while U.S. Pat. No. 2,256,264 teaches a polymerization catalyst system from a halogenated metal of groups IVa, Va, or VIa (e.g. TiCl4), aluminum chloride, hydrogen chloride and powdered aluminum. U.S. Pat. No. 3,121,064 teaches regenerating a titanium halide catalyst component with dry halogen chloride. Sulfur dioxide and sulfur trioxide have been disclosed to treat an olefin polymerization catalyst component consisting of a titanium or vanadium compound supported on a metal oxide or hydroxide (U.S. Pat. No. 4,027,088 and British Pat. No. 1,492,549).

Certain mineral and organic acids and anhydrides have been used in olefin polymerization systems which do not employ an organoaluminum-transition metal compound catalyst to form crystalline polymers. References to such systems are made in U.S. Pat. Nos. 3,426,007, 3,476,731, 3,497,488, Re. 29,504, 3,676,523, 3,686,351, 3,850,897, 3,896,087, and 4,029,866.

Carboxylic acids have been added to ethylene polymerization to reduce deposition of polymer on reactor walls (U.S. Pat. No. 3,082,198). Alkali metal salts of inorganic oxyacids have been used in an olefin polymerization catalyst comprising an aluminum sesquihalide and a transition metal halide (U.S. Pat. No. 3,400,084). Acid and base ion exchange resins have been used in olefin polymerization systems to produce crystalline polymer (U.S. Pat. No. 3,595,849).

An object of this invention is to produce catalyst modifiers which decrease Hexane Solubles while maintaining reasonable polymerization activity. A further object of this invention is to produce a polymeric product having acceptable odor. Other objects are described herein.

SUMMARY OF THE DISCLOSURE

A propylene polymerization catalyst is formed by incorporating into a catalytic mixture comprising a transition metal compound and an organoaluminum compound, effective amounts of Group Va or Group VII oxygen mineral acids whereby the amount of n-hexane-soluble polymeric product is decreased.

BRIEF DESCRIPTION OF THE INVENTION

Advantages of this invention include catalyst system which produces a commercially acceptable amount of Hexane Solubles polymer while maintaining reasonable catalytic activity. Further, catalyst modifiers of this invention generally do not introduce unacceptable levels of odor-forming compounds nor known compounds which may be environmentally detrimental. Since the modifiers of this invention are mineral acids, possibly harmful complex organic compounds are not added to the polymerization system.

Modifiers of this invention are Group Va or Group VII oxygen mineral acids. These modifiers include oxygen mineral acids of nitrogen, phosphorous, and chlorine and specifically include nitric acid, phosphoric acid, phosphorous acid and perchloric acid. Examples of other Group VA and Group VII oxygen mineral acids include nitrous acid, peroxo nitric acid, peroxonitrous acid, nitroxylic acid, hyponitrous acid, diphosphoric acid, triphosphoric acid, polyphosphoric acid, meta phosphoric acid, trimeta phosphoric acid, tetra meta phosphoric acid, peroxo (mono) phosphoric acid, peroxo diphosphoric acid, hydrophosphoric acid, diphosphoric (III, IV) acid, diphosphorous acid, hypophosphorous acid, arsenic acid, arsenious acid, hexahydroxoantimonic acid, chloric acid, chlorous acid, hypochlorous acid, bromic acid, bromous acid, hypobromous acid, periodic acid, hypobromous acid, periodic acid, iodic acid, permanganic acid, manganic acid, pertechnetic acid, perrhenic acid and rhenic acid. Preferably, these mineral acid modifiers are in concentrated aqueous solutions, although less concentrated solutions are useful. For example, preferred concentrations of specific acids are nitric acid—about 70 wt.%, $HNO_3$, phosphoric acid—about 85 wt.%, $H_3PO_4$, phosphorous acid—about 30 wt.%, $H_3PO_3$, and perchloric acid—about 72 wt.% $HClO_4$.

The exact amount of the modifiers useful in this invention varies depending upon the specific modifer, the precise make-up of the other catalyst components, and the polymerization conditions. Typically effective amounts range from a molar ratio to the transition metal compound of about 0.01 to 1 to about 0.7 to 1 and preferably about 0.02 to 1 to about 0.5 to 1 and most preferably about 0.04 to 1 to about 0.1 to 1. The concentration of modifiers must be sufficient to show a decrease in Hexane Solubles. At reasonably low levels of modifiers, the yield of polymeric product is not seriously affected. However, at higher levels of modifier the yield of product tends to decrease. An optimum level of modifier will produce both acceptable yields of Hexane Solubles and polymeric product.

For the purpose of determining Hexane Solubles, the "n-hexane" used is a mixture of substantially C-6 hydrocarbons containing about 85–88 wt.% normal hexane.

Although not preferred, modifiers of this invention can be utilized in conjunction with effective catalyst coadditives such as alkyl silicates, orthosilicate esters, esters, Lewis bases such as phosphines, phosphites, phosphates, phosphine oxides, aromatic amines, amine oxides, tertiary aliphatic amines and ethers or an organometallic chalcogenide such as bis(trialkyl)tin sulfide. These additional additives can be present in minor amounts ranging from about one-tenth to 30 mol percent and preferably about 1 to 20 mol percent of the transition metal halide in the catalyst system. Two or more suitable oxygen mineral acids can be combined and used in this invention. In addition, the oxygen mineral acids useful in this invention can be mixed with other compatible mineral acids for use in this invention.

The catalyst system described in this invention contains (a) an organoaluminum compound and (b) a transition metal compound in addition to minor amounts of other additives.

Useful organoaluminum compounds include trialkylaluminum, dialkylaluminum halides, mixtures of trialkylaluminum with dialkylaluminum halides and mixtures of trialkylaluminum with alkylaluminum dihalides. Also catalytic effective amounts of mixtures of trialkylaluminums and dialkylaluminum halides can be used in conjunction with alkylaluminum dihalides. Useful halides include bromides and chlorides and useful alkyl radicals contain from two to about six carbon atoms. The preferable halide is chloride and the preferable alkyl radical is ethyl. Diethylaluminum chloride (DEAC) is most preferable. In a trialkylaluminum-dialkyl-aluminum halide mixture, the preferred amount of trialkyl-aluminum is about 20 to 50 mol percent. In a trialkyl-aluminum-alkylaluminum dihalide mixture, the preferred amount of trialkylaluminum is about 30 to 70 mol percent and most preferably about 40 to 60 mol percent.

The transition metal compounds useful as a component in the catalyst system of this invention are compounds of transition metals of Groups IVB, VB and VIB of the Periodic Table. Preferably, the transition metal compound is a halide of titanium, vanadium, chromium or zirconium. Most preferably, titanium trichloride and especially activated titanium trichloride is used. Titanium trichloride can be activated to a high degree of polymerization activity by chemical and physical means. One useful activated titanium trichloride has an approximate stoichiometric formula of $TiCl_3 . \frac{1}{3} AlCl_3$ and has been comminuted. Further, titanium trichloride can be activated by forming adducts with Lewis bases such as ethers or by supporting the titanium trichloride on a catalytically inert substance such as a metal oxide or salt. One suitable titanium trichloride is described in U.S. Pat. No. 3,984,350 incorporated by reference herein.

The molar ratio of transition metal halide to organoaluminum compound in a catalyst system can range from about one-tenth to about 10, typically is about 1 to 3 and preferably is about 2. The amount of catalyst in a polymerization depends on the reactor size and type and on the amount and type of olefin monomer and is known to the skilled artisan.

Preferably, a catalyst system package is made prior to introduction of such package into a polymerization reactor. Catalyst components can be mixed together in any order, typically using an inert hydrocarbon or the monomer as a suitable medium, although preferably the modifiers first are added to an inert hydrocarbon solution of the organoaluminum compound. Preferably, the catalyst modifiers of this invention are added slowly while mixing to a solution of organoaluminum compound in an inert hydrocarbon. Such resulting mixture is added to a suspension of transition metal compound in an inert hydrocarbon. After complete mixing the resulting catalyst package can be introduced into a polymerization reactor.

Since the catalyst systems used in this invention are sensitive to oxygen and moisture, suitable precautions should be taken during catalyst preparation, transfer and use.

The polymerization process of this invention can be practiced at pressures ranging from about atmospheric to about 20,000 p.s.i.g. and preferably from about 30 to 1000 p.s.i.g.

The polymerization time depends on the process used. In batch processes the polymerization contact time usually is about one-half to several hours and typically is one to four hours in autoclave processes. In a continuous process, contact time in the polymerization zone is controlled as required and typically ranges from about one-half to several hours. Since in this type of process unreacted monomer continuously can be recycled into the polymerization zone, the contact time can be shorter than in a batch process.

The liquid organic solvents used in the slurry polymerization technique include aliphatic alkanes and cycloalkanes such as pentane, hexane, heptane or cyclohexane; a hydrogenated aromatic compound such as tetrahydronaphthalene or decahydronaphthalene; a high molecular weight liquid paraffin or mixtures of paraffins which are liquid at the reaction temperature; an aromatic hydrocarbon such as benzene, toluene or xylene; or a haloaromatic compound such as chlorobenzene, chloronaphthalene or o-dichlorobenzene. Other suitable solvents include ethylbenzene, isopropylbenzene, ethyltoluene, n-propylbenzene, diethylbenzenes, mono and di-alkylnaphthalenes, n-pentane, n-octane, isooctane and methyl cyclohexane. Preferably, liquid hydrocarbons are used; most preferably, n-hexane is the polymerization medium. Although the nature of the solvent can be varied considerably, the solvent should be liquid under the reaction conditions and should be relatively inert. Advantageously, the solvent used can be purified prior to use by distillation, by reaction with an aluminum alkyl, or by adsorption with molecular sieves.

The polymerization temperature depends upon the specific catalyst system used and can range from below about 0° C. to about 120° C. However, at temperatures below about 0° C. the polymerization rate slows and reactor residence times become unreasonably long, while at temperatures above about 120° C. the polymerization rate is too high which results in excessive amounts of n-hexane-soluble products. Preferably, the temperature ranges from about 2° C. to about 95° C. and most preferably from about 50° C. to about 80° C.

After polymerization catalyst residues contained in the polymeric product can be deactivated by conventional methods such as washing with methanol, water and caustic.

This invention is useful in polymerizing propylene to a normally solid, substantially crystalline polymer, although propylene also can be polymerized with minor amounts up to about 30 wt.% of ethylene or other copolymerizable alpha-olefins containing up to 10 carbon atoms to form random, pure-block, terminal block and multisegment copolymers.

The normally-solid tropylene polymers prepared according to this invention have molecular weights ranging from about 50,000 to 5,000,000 and typically range from about 200,000 to 2,000,000. The molecular weights of such propylene polymers can be controlled by methods known to the art, such as by polymerizing in the presence of hydrogen in an amount determined by melt flow rate or by the molecular weight distribution desired.

This invention is demonstrated but not limited by the following Examples.

EXAMPLES I-VI

A series of propylene polymerizations were performed using various Group Va or VII oxygen mineral acids as catalyst modifiers. In addition, control runs were performed without modifiers of this invention.

Modified catalyst was prepared in a nitrogen-purged dry box by adding a measured amount of modifier dropwise with stirring to a portion of diethylaluminum chloride (25 wt.% in hexane). This mixture then was added dropwise with stirring to a suspension of titanium trichloride in hexane. The quantities were measured such that two moles of DEAC were added to one mole of $TiCl_3$.

Two milliliters of the resulting modified DEAC-$TiCl_3$ mixture were diluted with 200 milliliters of dry n-hexane in a 450 milliliter pressure bottle which was sealed and placed in a water bath maintained at 160° F. Propylene was introduced into the bottle and a pressure of 40 p.s.i.g. maintained for two hours while stirred magnetically. After two hours the bottle was cooled, uncapped and the contents filtered. A 10% aliquot was taken from the filtrate and evaporated. The remaining solid material was weighed to determine the amount of Hexane Solubles. The filtered solid polypropylene was vacuum dried and weighed. Results are shown in Table I.

TABLE 1

| Example (Run) | Catalyst (Molar Ratio) | Yield (g/g of $TiCl_3$) | Hexane Solubles (Wt. %) |
|---|---|---|---|
| (A) | DEAC/AA $TiCl_3$ (1) (2/1) | 133 | 3.41 |
| I | DEAC/AA $TiCl_3$/Nitric Acid (71%) (2/1/0.04) | 114 | 2.78 |
| II | DEAC/AA $TiCl_3$/Phosphoric Acid (85%) (2/1/0.04) | 118.5 | 2.98 |
| III | DEAC/AA $TiCl_3$/Phosphorous Acid (30%) (2/1/0.04) | 133.5 | 2.9 |
| IV | DEAC/AA $TiCl_3$/Nitric Acid (71%)/HCl (37%) (2/1/0.04/0.02) | 96.5 | 2.53 |
| (B) | DEAC/ABC-$TiCl_3$ (2/1) | 425 | 1.62 |
| V | DEAC/ABC-$TiCl_3$/Perchloric Acid (72%) (2/1/0.1) | 388 | 0.74 |
| (C) | DEAC/ABC-$TiCl_3$ (2/1) | 335 | 1.02 |
| VI | DEAC/ABC-$TiCl_3$/Nitric Acid (71%) (2/1/0.04) | 261 | 0.8 |

(1) AA $TiCl_3$ - Stauffer Chemical Company Type 1.1
(2) ABC-$TiCl_3$ (prepared according to U.S. Pat. No. 3,984,350)

I claim:

1. A polymerization process comprising contacting, under polymerization conditions, propylene or a mixture of propylene and one or more copolymerizable alpha-olefins with a catalyst comprising a titanium trihalide; an organoaluminum compound; and an effective amount of a Group Va or VII oxygen mineral acid in a molar ratio from about 0.01 to 1 to about 0.7 to 1 whereby the amount of n-hexane soluble polymeric product produced is decreased.

2. The process of claim 1 wherein the organoaluminum compound is diethylaluminum halide, triethylaluminum, a mixture thereof or a mixture of triethylaluminum with ethylaluminum dihalide.

3. The process of claim 1 wherein the oxygen mineral acid is phosphoric acid, phosphorous acid, or perchloric acid.

4. The process of claim 1 wherein the mineral acid is nitric acid.

5. The process of claim 1 wherein the mineral acid is phosphoric acid.

6. The process of claim 1 wherein the mineral acid is phosphorous acid.

7. The process of claim 1 wherein the mineral acid is perchloric acid.

8. The process of claim 2 wherein the organoaluminum compound is diethylaluminum chloride, triethylaluminum, a mixture thereof or a mixture of triethylaluminum with ethylaluminum dichloride.

9. The process of claim 3 wherein the molar ratio of oxygen mineral acid to titanium trihalide is about 0.02 to 1 about 0.5 to 1.

10. The process of claim 4 wherein the molar ratio of nitric acid to titanium trihalide is about 0.02 to 1 to about 0.5 to 1.

11. The process of claim 5 wherein the molar ratio of phosphoric acid to titanium trihalide is about 0.02 to 1 to about 0.5 to 1.

12. The process of claim 6 wherein the molar ratio of phosphorous acid to titanium trihalide is about 0.02 to 1 to about 0.5 to 1.

13. The process of claim 7 wherein the molar ratio of perchloric acid to titanium trihalide is about 0.02 to 1 to about 0.5 to 1.

14. The process of claim 3 wherein the organoaluminum compound is diethylaluminum dichloride.

* * * * *